March 27, 1928.
H. E. THOMPSON
COMPRESSOR VALVE
Filed April 26, 1926
1,663,737
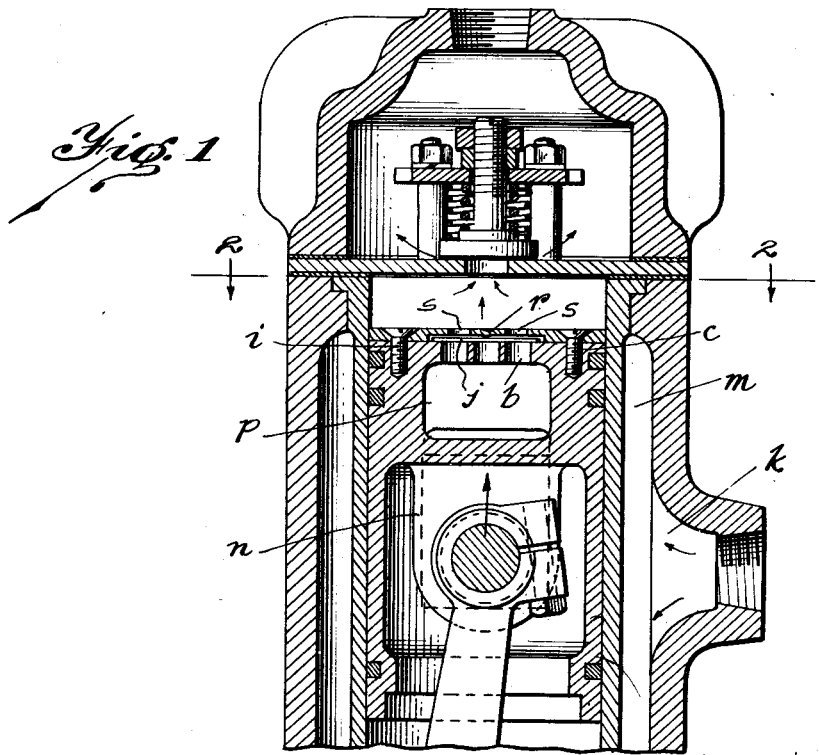
Fig. 1
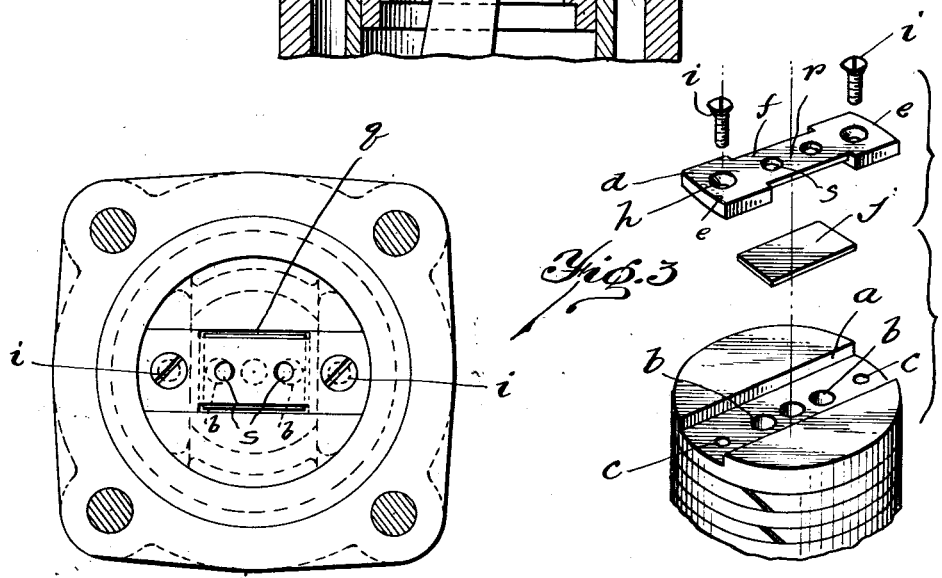
Fig. 2
Fig. 3
INVENTOR.
Harry E. Thompson
BY
Stuart C. Barnes
ATTORNEY.

Patented Mar. 27, 1928.

1,663,737

UNITED STATES PATENT OFFICE.

HARRY E. THOMPSON, OF DETROIT, MICHIGAN, ASSIGNOR TO UNIVERSAL COOLER CORPORATION, OF DETROIT, MICHIGAN, A CORPORATION OF MICHIGAN.

COMPRESSOR VALVE.

Application filed April 26, 1926. Serial No. 104,601.

This invention relates to compressor valves, and has for its object the particular form of compressor valve for use preferably on the head of the piston. It has been quite a problem in compressors for refrigerator units to get a reliable easy action, easily made, and effective valve construction. It is especially desirable to get a valve construction which does not project above the face of the head of the piston, for this may require considerably more clearance between the piston head and the cylinder head than would otherwise be necessary. This results in failing to force out all the gases on the compression stroke and the result is that the residuum re-expands and has to be re-compressed, resulting in a useless waste of energy.

I have designed a form of air compressor valve which is very simple, can be easily made of pressed metal parts, and which is very effective in its operation, and which can be made absolutely flush with the top of the piston.

In the drawings:

Fig. 1 is a vertical section of the compressor, including the valve.

Fig. 2 is a section on the line 2—2 of Fig. 1.

Fig. 3 is a detail perspective of the valve parts and the end of the piston.

The end of the piston is grooved as at $a$. This may be made as part of the casting, or preferably it is milled into the end of the piston. This rectangular section groove has the floor of the groove bored with the perforations $b$—$b$, preferably three in number. Tapped perforations $c$ are also drilled and tapped in the ends of the groove. This groove seats a cage or pressed metal bridging piece $d$, which comprises the abutments $e$—$e$, and the span $f$. Preferably this span is perforated and is also of appreciable less width than the abutments at the ends. Countersunk screw-holes $h$ are drilled in the abutments and screw $i$ are arranged to secure the bridging piece in the groove. Under the span is located a loose valve of rectangular shape, preferably, and designates $j$.

The incoming gases of the compressor are taken through the passage $k$, then run around the annular passage $m$ until they reach the groove $n$, in the side of the cylinder. They then pass through the hollow center $p$ of the piston and can then pass up through the openings $b$ in the piston head, and out around the clearance $q$ between the valve in its upper position and the side walls of the groove $a$. Preferably a slight nub $r$ is pressed in the face of the span which forms a point contact for the valve when in its upper position rather than a face-to-face contact which might make the valve stick. Furthermore, openings $s$ are provided in the bridge span $f$ which bring to bear the pressure of the gases in dislodging the valve from its upper position.

This valve has little tendency to stick. It is loose in the cage formed in the piston head and the bridge span so that it may shift around and clear itself of particles calculated to stick or start to build in the valve or valve seat, and it is also practically noiseless for its lift is very limited and cannot lift a considerable distance and then snap back, giving unpleasant noises as is the case with many valves exhibted in the prior art.

What I claim is:

1. A compressor valve having in combination a pair of members fitted together and shaped so as to provide a chamber, one of said members having a port in communication with the chamber, a free floating valve operating in this chamber which in one position covers the port, and in another position is removed from the port to permit the flow of fluid therethough, the other of said members being of solid construction and provided with a cut-away portion which is positioned to one side of the free floating valve to thus provide an outlet for the fluid.

2. A compressor valve, having in combination with a member provided with a groove having one or more ports in its bottom, a cage having a nub in the bottom thereof and having a portion of the cage in clearance relation with the walls of the groove, and a free floating valve operating in the cage to cover the ports in the lower position and to bear against the nub in the bottom of the cage in its open position.

3. A compressor valve, having in combination with a piston having one or more ports in its head, a cage in the form of a bridge-like piece with a pair of abutments and a narrower span over the ports, the span being spaced from the ports, and a loose valve functioning between the head of the piston and the under side of the span and arranged to cover the ports in one movement of the piston.

4. A compressor valve, having in combination with a grooved piston head having one or more ports in the bottom of the groove, a cage situated in the groove and comprising a bridge-piece having abutments connected by a narrower span, the last of which is spaced from the bottom of the groove but over the port or ports, and a valve functioning between the span and the bottom of the groove over the ports.

5. A compressor valve, having in combination with a grooved piston head having one or more ports in the bottom of the groove, a cage situated in the groove and comprising a bridge-piece having abutments connected by a narrower span, the last of which is spaced from the bottom of the groove but over the port or ports, and a free-floating valve functioning between the groove in the bottom of the span and the top of the piston over the ports.

6. A compressor valve, having in combination with a grooved piston head having one or more ports in the bottom of the groove, a cage situated in the groove and comprising a bridge-piece having abutments connected by a narrower span, the last of which is spaced from the bottom of the groove but over the port or ports, and a free-floating valve functioning between the groove in the bottom of the span and the top of the piston over the ports, said span being arranged to have a contact with the top of the valve of relatively small surface area to prevent sticking.

7. A compressor valve, having in combination with a grooved piston head having one or more ports in the bottom of the groove, a cage situated in the groove and comprising a bridge-piece having abutments connected by a narrower span, the last of which is spaced from the bottom of the groove but over the port or ports, and a free-floating valve functioning between the span and the bottom of the groove in the top of the piston over the ports, the said span having a struck-in portion to engage the valve and prevent extended surface-to-surface contact of valve and span.

8. A compressor valve, having in combination a member provided with a port, a cage associated with said member in such a way as to provide a chamber in communication with the port, a free floating valve in the chamber and operating in the chamber so that in one position it covers the port and in another position is removed from the port to permit passage of fluid therethrough, and a nub on the cage with which the valve contacts in one position.

9. A compressor valve having in combination a pair of members fitted together and shaped so as to provide a chamber, one of said members having a port in communication with the chamber, a free floating valve operating in this chamber which in one position covers the port and in another position is removed from the port to permit the flow of fluid therethrough, one of said members being solid adjacent the valve but being cut away where the same is joined to the other member to thus provide an outlet for the fluid.

10. A compressor valve having in combination a pair of members fitted together and shaped so as to provide a chamber, one of said members having a port in communication with the chamber, a free floating valve operating in this chamber which in one position covers the port and in another position is removed from the port to permit the flow of fluid therethrough, one of said members being cut away where the same is joined to the other member to thus provide an outlet for the fluid, and means in the chamber for contacting with the free floating valve to prevent sticking thereof.

11. A compressor valve having in combination a member provided with a port, a cage associated with said member in such a way as to provide a chamber in communication with the port, a free floating valve in the chamber and operating in the chamber so that in one position it covers the port, and in another position it is removed from the port to permit passage of fluid therethrough, and means positioned so as to separate the valve from the cage to prevent the valve from sticking to the cage.

12. A compressor valve having in combination a member provided with a port, a cage associated with said member in such a way as to provide a chamber in communication with the port, a free floating valve in the chamber and operating in the chamber so that in one position it covers the port, and in another position it is removed from the port to permit passage of fluid therethrough, and a nub positioned to separate the free floating valve from the cage when the valve is in open position to prevent the valve from sticking to the cage.

In testimony whereof I have affixed my signature.

HARRY E. THOMPSON.